United States Patent [19]
Ochsner

[11] 3,917,675

[45] Nov. 4, 1975

[54] NOVEL ODORANTS

[75] Inventor: Paul Albert Ochsner, Geneva, Switzerland

[73] Assignee: Givaudan Corporation, Clifton, N.J.

[22] Filed: Mar. 6, 1974

[21] Appl. No.: 448,607

[30] Foreign Application Priority Data
Mar. 15, 1973 Switzerland.......................... 3759/73
Jan. 17, 1974 Switzerland.......................... 616/74

[52] U.S. Cl........... 260/488 R; 252/522; 260/617 R
[51] Int. Cl.² C07C 69/07; C07C 69/145; C07C 69/24
[58] Field of Search..................... 260/488 R, 617 R

[56] References Cited
UNITED STATES PATENTS
3,514,489  5/1970  Lemberg........................ 260/488 R

OTHER PUBLICATIONS

Chem. Abstracts, 55:16493g, (1961).
Chem. Abstracts, 64:6700e, (1966).
Chem. Abstracts, 50:14577g.
Chem. Abstracts, 40:7237.

Primary Examiner—Vivian Garner
Attorney, Agent, or Firm—Thomas Cifelli, Jr.

[57] ABSTRACT

Novel cyclohexene odorants, odorant compositions containing same, and process for producing said odorants and compositions.

4 Claims, No Drawings

NOVEL ODORANTS

FIELD OF THE INVENTION

This invention relates to novel cyclohexene derivatives and fragances.

SUMMARY OF THE INVENTION

The cyclohexene derivatives provided by the present invention are compounds of the general formula

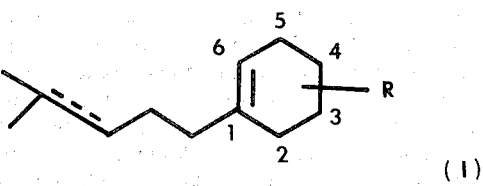

(I)

wherein R represents a ($C_{1-3}$-alkanoyl)oxymethyl group in the 3 or 4-position and the broken line denotes an optional carbon-carbon bond,
and isomer mixtures of said compounds.

It will be appreciated that formula I is intented to include all of the possible isomers of the compounds denoted thereby.

According to the process provided by the present invention, the cyclohexene derivatives aforesaid (that is to say, the compounds of formula I and isomer mixtures thereof) are manufactured by reacting a compound of the general formula

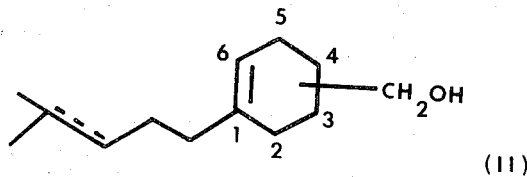

(II)

wherein the hydroxymethyl group is present in the 3- or 4-position and the broken line has the significance given earlier,
or an isomer mixture of compounds of formula II with a $C_{1-3}$-alkanoylating agent; said process including, if desired, a hydrogenation of the exocyclic double-bond prior to or subsequent to said reaction.

The cyclohexene derivatives (i) and isomer mixtures thereof in accordance with the present invention possess characteristic odorant properties making them useful in the perfume industry for the manufacture of perfumes and perfumed products.

DESCRIPTION OF THE PREFERRED EMBODIMENTS

The reaction of a compound of formula II with a $C_{1-3}$-alkanoylating agent, which may alternatively be described as a formylation, acetylation or propionylation of a compound of formula II, can be carried out according to methods known per se.

A suitable formylating agent is, for example, a mixture of acetic anhydride and formic acid with which the compounds of formula II can be formylated at room temperature.

Suitable acetylating agent are, for example, acetic anhydride, especially in the presence of sodium acetate or concentrated phosphoric acid, or an acetyl halide such as acetyl chloride in the presence of an organic base such as pyridine or dimethyl aniline.

The propionylation can be carried out in a corresponding manner. Thus it can be carried out using propionic anhydride, especially in the presence of sodium propionate or concentrated phosphoric acid, or with a propionyl halide such as propionyl chloride in the presence of an organic base such as pyridine, dimethylaniline etc. The propionylation can, however, also be carried out using propionic acid itself in the presence of a strong acid such as sulphuric acid or p-toluenesulphonic acid etc.

Furthermore, the acylation can be carried out using a corresponding isopropenyl ester (isopropenyl formate, isopropenyl acetate or isopropenyl propionate) in the presence of an acid such as, for example, p-toluenesulphonic acid. As will be evident, this acylation procedure may be described as an interchange of ester radicals.

The hydrogenation of the exocyclic double-bond in a compound of formula II or a $C_{1-3}$-alkanoyl derivative thereof can be carried out, for example, catalytically. Raney-nickel is, for example, a suitable catalyst. The catalytic hydrogenation is conveniently carried out in a solvent (e.g. an alcohol such as methanol) and at room temperature.

According to a preferred embodiment of the process provided by the present invention, there is used as the starting material an isomer mixture of the formula

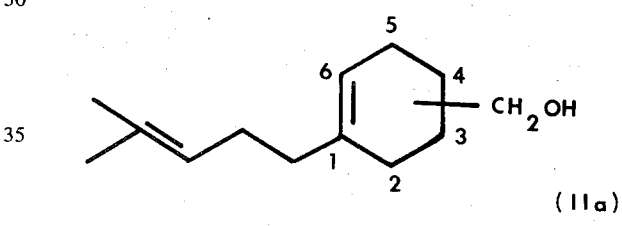

(IIa)

wherein the hydroxymethyl group is present in the 3- or 4-position,
since this is accessible by reduction of the corresponding aldehyde mixture. The exocyclically-unsaturated esters of formula I which are likewise obtained as an isomer mixture after the alkanoylation can, if desired, be separated into the individual components; for example, by preparative gas chromatography or distillation on a spinning-band column. This separation is, however, not necessary.

The cyclohexene derivatives provided by the present invention (i.e. the compounds of formula I and isomer mixtures thereof) possess particular odorant properties. They can accordingly be used in the perfume industry for the manufacture of perfumes and perfumed products. For example, they can be used for the perfuming of soaps, solid and liquid detergents, aerosols and cosmetic products of all kinds such as toilet waters, salves, face milks, make-up, lipsticks, bath salts and bath oils. In perfumes or perfumed products, the content of the present cyclohexene derivatives lies within wide limits; for example, between about 1% (detergents) and about 20% (alcoholic solution). In perfume bases or concentrates, the content can, of course, also lie above 20%.

The cyclohexene derivatives provided by this invention make available, in general, a fruity, flowery, green, especially rose-like, odour having very good tenacity. The cyclohexene derivatives in which R represents acetoxymethyl and in which an exocyclic double-bond is present are of particular value by virtue of their particular fragrance qualities.

The cyclohexene derivatives provided by this invention can be advantageously incorporated into odorant compositions of the flowery type. Such compositions are thereby modified in an advantageous manner in that their flowery character is intensified in a remarkable manner and, in particular, fresh, rose-like, muguet-like notes are emphasized in a desirable manner.

The high stability of the present cyclohexene derivatives in odorant compositions of the most diverse types and their pronounced tenacity predestinates them as components of such compositions.

The following Examples illustrate the process provided by the present invention:

Example 1

77.7 g (0.4 mol) of the alcohol mixture of formula IIa hereinbefore [5-[3- and 4-(hydroxymethyl)-1-cyclohexenyl]-2-methyl-2-pentene], 120.1 g (1.2 mol) of freshly distilled isopropenyl acetate and 0.1 g of p-toluenesulphonic acid are added to a round-bottomed flask which is provided with a stirrer, thermometer, condenser and dropping funnel. The mixture is maintained at reflux temperature for 3 hours, then taken up in hexane, washed with water, then with a sodium bicarbonate solution and finally to neutrality with water. After evaporation of the solvent, the crude product is distilled. There are obtained 71 g (75% yield) of 5-[3- and 4-(acetoxymethyl)-1-cyclohexenyl]-2-methyl-2-pentene as an isomer mixture; boiling point $_{0.01}$ = 84°–85°C; $n_D^{20}$=1.4800; $d_4^{20}$=0.958.

Example 2

255.5 g of acetic anhydride and 2.5 g of 85% orthophosphoric acid are added to a round-bottomed flask which is provided with a stirrer, thermometer, condenser and dropping funnel. The contents of the flask are warmed to 40°C and at this temperature, with cooling, there are added over a period of 30 minutes 388.6 g (2 mol) of the alcohol mixture of formula IIa hereinbefore. The mixture is stirred at 40°C for a further 1 hour and then the contents of the flask are poured on to 1.25 kg of crushed ice. The mixture is extracted with toluene, the toluene extract washed with water, a 10% sodium carbonate solution and then again with water. The solvent is removed under a vacuum and then the product is subjected to a fractional distillation. There are obtained 435.5 g (92% yield) of the ester mixture obtained according to Example 1.

Example 3

15 g of 98% formic acid are slowly added dropwise at a temperature of 45°C to 30 g of acetic anhydride. This mixture is left for 2 hours at 45°C.

26.4 g of the mixed anhydride are added to a flask provided with a stirrer, thermometer, dropping funnel and condenser and cooled to 10°C. 38.9 g of the alcohol mixture of formula IIa hereinbefore are slowly added dropwise at this temperature. The mixture is then left to stand for 12 hours at room temperature. It is then taken up in ether, the ethereal solution is washed with water, saturated sodium carbonate solution and again with water to neutrality. The ethereal solution is dried over sodium sulphate and the solvent distilled off. The crude product is distilled, there being obtained 27.4 g of 5-[3- and 4-(formyloxymethyl)-1-cyclohexenyl]-2-methyl-2-pentene as an isomer mixture; boiling point $_{0.07}$ = 81°C; $n_D^{20}$ = 1.4848; yield: 61% of theory.

Example 4

A solution consisting of 64.8 g (1/3 mol) of the alcohol mixture of formula IIa hereinbefore, 37.0 g of propionic acid and 0.1 g of p-toluenesulphonic acid in 150 ml of toluene is maintained at reflux temperature in a flask provided with a condenser and water separator until 6 g of water have separated. The mixture is washed firstly with a saturated sodium carbonate solution and then with water up to neutrality. The solvent is distilled off and the crude product fractionally distilled in a vacuum. There are obtained 57 g of 5-[3- and 4-(propionyloxymethyl)-1-cyclohexenyl]-2-methyl-2-pentene as an isomer mixture; boiling point 0.04 = 86 °C; $n_D^{20}$ = 1.4800; yield; 65% of theory.

Example 5

A solution consisting of 47.3 g (0.2 mol) of the ester mixture prepared according to Example 1, 300 ml of ethanol and 4.7 g of Raney-nickel is added to a hydrogenator. The hydrogenation is carried out at atmospheric pressure and room temperature. The hydrogen absorption is interrupted after 4.5 l. The catalyst is filtered off and the ethanol is distilled off. The crude product is fractionally distilled. There are obtained 28 g of 5-[3- and 4-(acetoxymethyl)-1-cyclohexenyl]-2-methyl-pentane as an isomer mixture; boiling point $_{0.15}$ = 84°C; $n_D^{20}$ = 1.4668; yield: 59% of theory.

The following Example illustrates typical odorant compositions containing the cyclohexene derivatives provided by the present invention:

A) "Muguet fantasy" composition

|  | Parts by weight |
|---|---|
| Ester mixture of Example 1 | 300 |
| Phenylethyl acetate | 5 |
| Citral | 5 |
| Bergamotte oil | 20 |
| Indole 10% (in diethyl phthalate) | 30 |
| Rhodinol | 50 |
| Santalol | 50 |
| Linalool | 60 |
| Phenylethyl alcohol | 80 |
| α-Hexyl-cinnamaldehyde | 200 |
|  | 800 |

B) "Rose" composition

|  | Parts by weight |
|---|---|
| Ester mixture of Example 1 | 100 |
| $C_9$-Aldehyde 10% | 5 |
| Acetaldehyde-propyl-phenylethylacetal | 5 |
| $C_9$-Aldehyde 10% | 10 |
| Patchouli oil | 10 |
| Pepper essence (West Indian) | 10 |
| Phenylethyl acetate | 15 |
| Guayl acetate | 15 |
| Geranium oil Bourbon | 20 |
| Eugenol | 30 |
| Trichloromethylphenylcarbinyl acetate | 60 |
| α-Hexylcinnamaldehyde | 60 |
| Linalool | 60 |
| Citronellol | 60 |
| Benzyl salicylate | 80 |
| Methylionone | 80 |
| Rhodinol pure | 90 |
| Geraniol | 120 |
| Phenylethyl alcohol | 170 |
| Total | 1000 |

C) "Chypre" composition

|  | Parts by weight |
|---|---|
| Ester mixture of Example 1 | 50 |
| Methyl-phenyl-carbinyl acetate | 10 |
| Civette abs. 10% | 10 |
| Coumarin | 10 |
| Amyl salicylate | 10 |

-continued

C) "Chypre" composition

| | |
|---|---|
| Resinoid Ciste Labdanum | 10 |
| Isobutylquinoline 10% | 15 |
| Benzyl acetate | 20 |
| Linalool | 20 |
| γ-Undecalactone 10% | 20 |
| Oak moss abs. Yugosl. | 20 |
| Ylang ylang Bourbon | 25 |
| Sandalwood oil | 30 |
| Musk ambrette | 30 |
| $C_{11}$-Aldehyde 10% | 30 |
| Rhodinol pure | 40 |
| Phenylethyl alcohol | 40 |
| Patchouli oil | 40 |
| Orange essence (Guinea) | 40 |
| α-Hexylcinnamaldehyde | 50 |
| Hydroxycitronellal | 60 |
| Vetivenyl acetate Bourbon | 60 |
| γ-Methylionone Coeur | 80 |
| Lemon essence (Messina) | 80 |
| Bergamotte oil | 100 |
| Total | 900 |

What is claimed is:

1. A compound having the formula

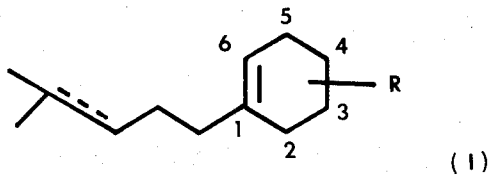

wherein R represents an alkanoyl-oxymethyl group in the 3 - or 4-position, said alkanoyl having 1–3 carbon atoms and the broken line denotes an optional carbon-carbon bond,
and mixtures thereof.

2. A compound in accordance with claim 1, having the formula 5-[3- or 4-(acetoxymethyl) - 1 -cyclohexenyl] - 2 - methyl - 2 - pentene or mixtures thereof.

3. A compound in accordance with claim 1, having the formula 5-[3- or 4 - (formyloxy-methyl) -1 -cyclohexenyl] - 2 - methyl - 2 - pentene or mixtures thereof.

4. A compound in accordance with claim 1, having formula 5-[3- or 4 - (propionyloxymethyl) - 1 - cyclohexenyl] - 2 -methyl - 2 -pentene or mixtures thereof.

* * * * *